United States Patent
Gaarder et al.

(10) Patent No.: US 6,493,060 B2
(45) Date of Patent: Dec. 10, 2002

(54) DUPLEXING IN AUTOMATIC DOCUMENT FEEDER UTILIZING A PATH SHORTER THAN THE LENGTH OF THE DOCUMENT TO BE DUPLEXED

(75) Inventors: Glenn Gaarder, Ramona, CA (US); William Wistar Rhoads, Escondido, CA (US); Kevin Bokelman, La Jolla, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/791,053

(22) Filed: Feb. 21, 2001

(65) Prior Publication Data

US 2001/0026040 A1 Oct. 4, 2001

Related U.S. Application Data

(62) Division of application No. 09/452,831, filed on Dec. 1, 1999, now Pat. No. 6,307,614.

(51) Int. Cl.⁷ ......................... G03B 27/32; G03B 27/52; G03B 27/00
(52) U.S. Cl. ............................. 355/24; 355/40; 355/407; 355/25; 355/26
(58) Field of Search ............................. 355/23–26, 405, 355/40, 407, 77; 358/496, 498; 271/184–186; 399/361, 367, 374; 101/33, 44

(56) References Cited

U.S. PATENT DOCUMENTS

| | | | | |
|---|---|---|---|---|
| 4,229,101 A | * | 10/1980 | Hamlin et al. | 355/77 |
| 4,348,101 A | * | 9/1982 | Schonfeld et al. | 355/14 R |
| 4,384,782 A | * | 5/1983 | Accquaviva | 355/3 SH |
| 4,419,007 A | * | 12/1983 | Kingsley | 355/14 SH |
| 4,431,303 A | * | 2/1984 | Hoffman | 355/3 SH |
| 4,459,013 A | * | 7/1984 | Hamlin et al. | 355/23 |
| 5,022,640 A | * | 6/1991 | Greco, Jr. | 271/31 |
| 5,203,554 A | * | 4/1993 | Suzuki et al. | 271/10 |
| 5,430,536 A | * | 7/1995 | Fullerton et al. | 355/320 |
| 5,438,435 A | * | 8/1995 | Lawniczak | 358/496 |
| 5,596,399 A | * | 1/1997 | Dempsey et al. | 399/45 |
| 5,784,680 A | * | 7/1998 | Taruki | 399/374 |
| 5,797,079 A | * | 8/1998 | Creutzmann et al. | 399/384 |

FOREIGN PATENT DOCUMENTS

| | | | |
|---|---|---|---|
| EP | 0488126 A1 | * | 3/1992 |
| EP | 0654933 A1 | * | 5/1995 |

* cited by examiner

Primary Examiner—Hung Henry Nguyen
(74) Attorney, Agent, or Firm—Roth & Goldman

(57) ABSTRACT

The footprint of a document scanning unit such as a copier, facsimile machine or document scanner or combinations thereof is reduced by causing overlap of the leading and trailing edges of long document sheets to be scanned in the document delivery roller system downstream of the scanning station. Differential slippage of the overlapping ends between a drive roller and a pinch roller is provided in a first embodiment. A second embodiment uses a moveable pinch roller in the document delivery system to selectively open and close a gap to permit slippage of the leading and trailing edges of the document. A third embodiment uses three document delivery rollers defining two spaced nips in which the leading and trailing edges of a long document are simultaneously present and a crenellated roller surface to guide the leading edge of the document to the desired nip in the delivery system.

13 Claims, 8 Drawing Sheets

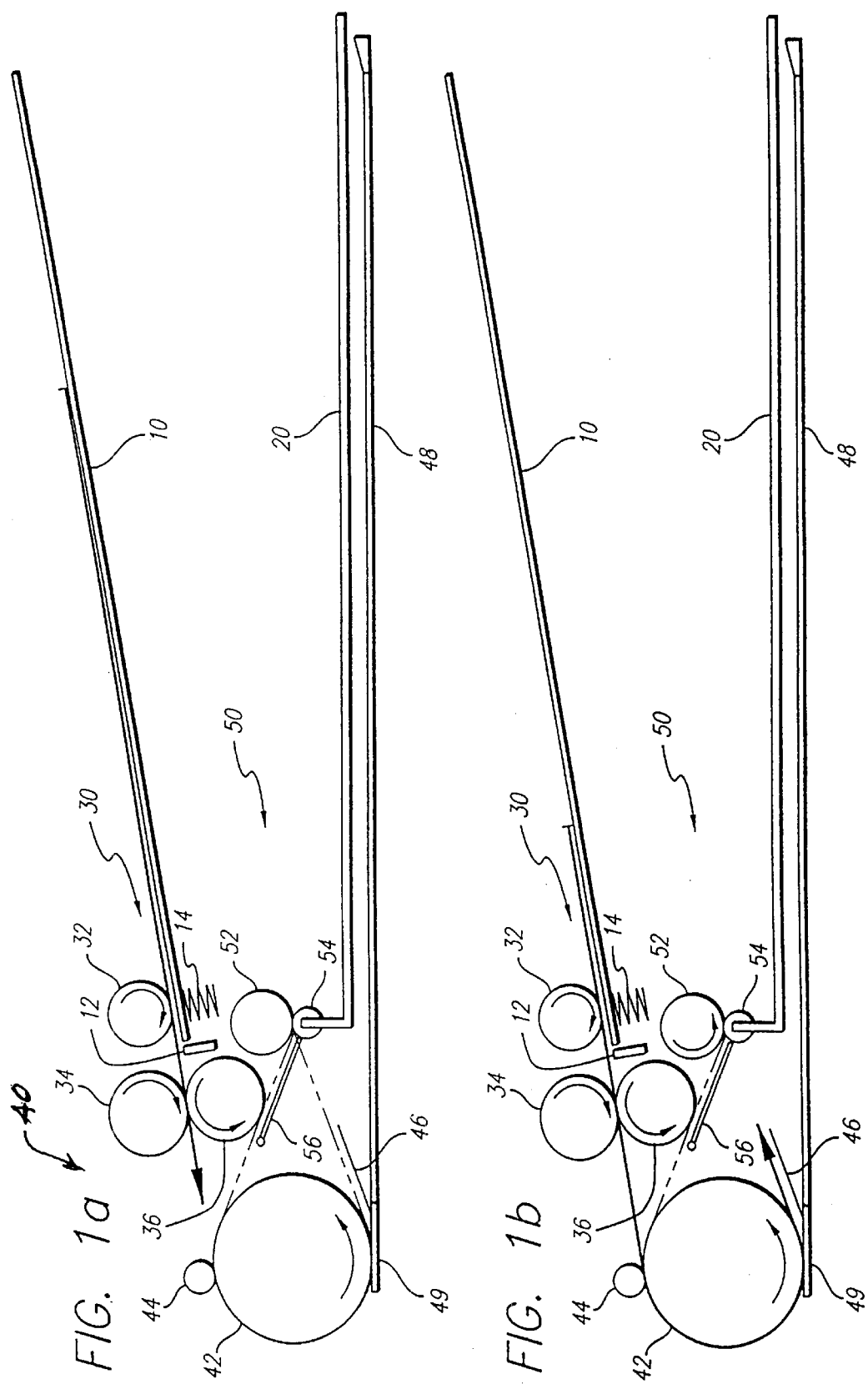

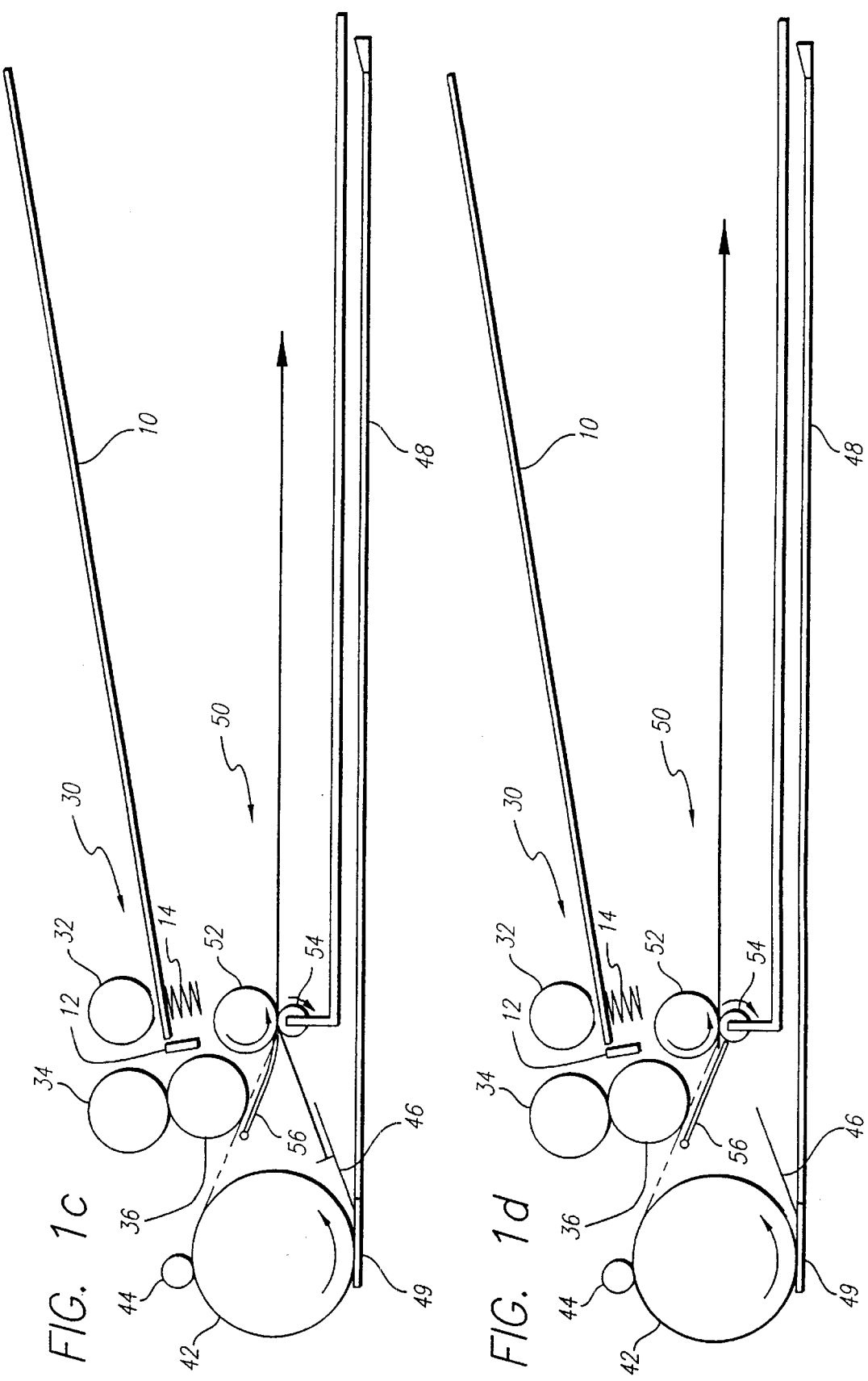

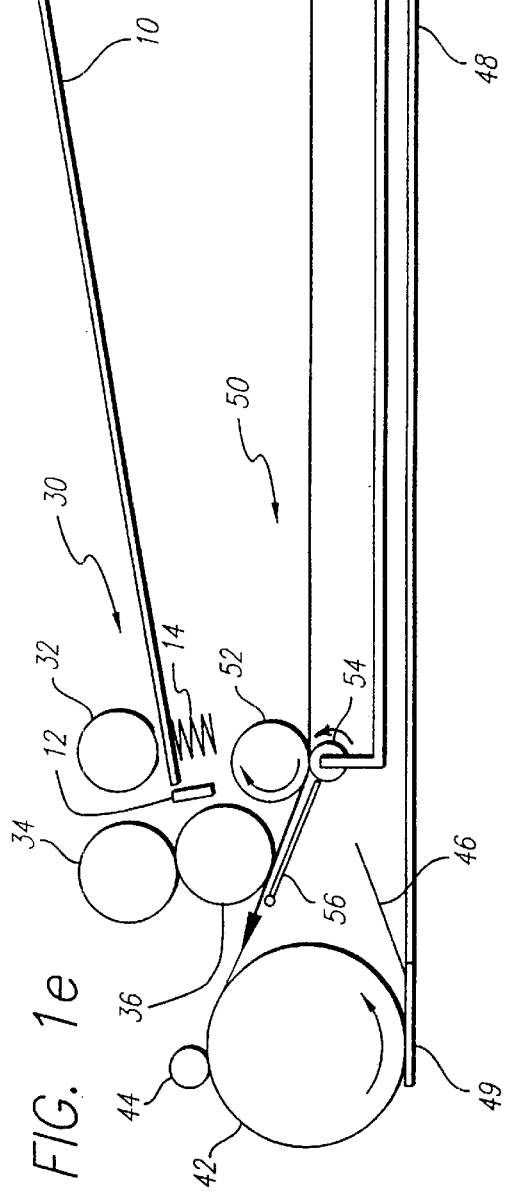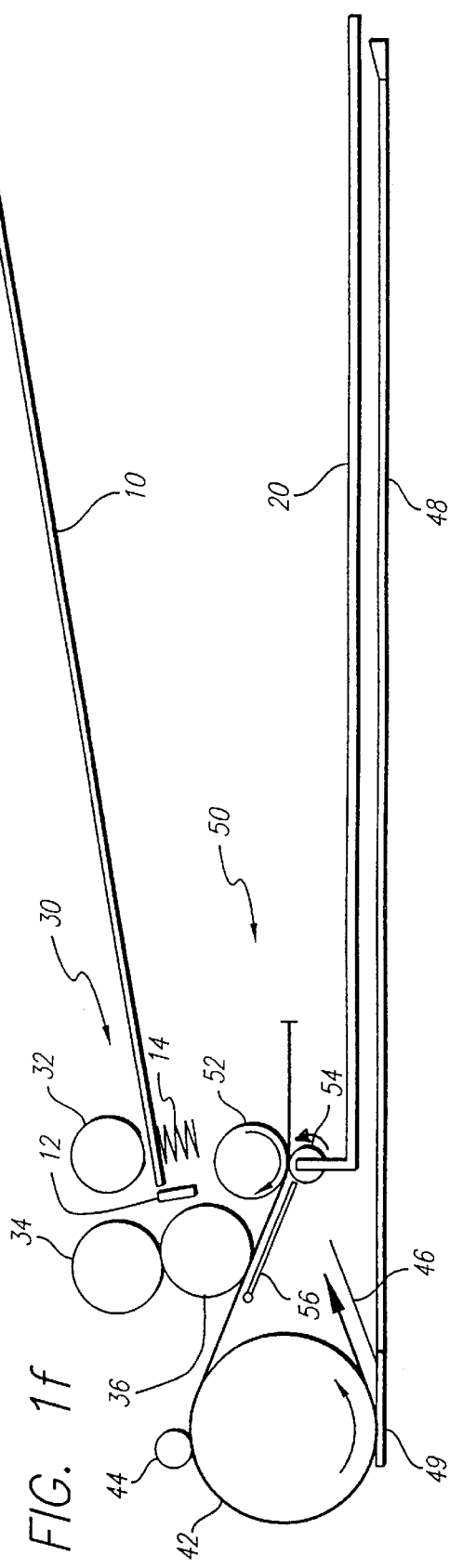

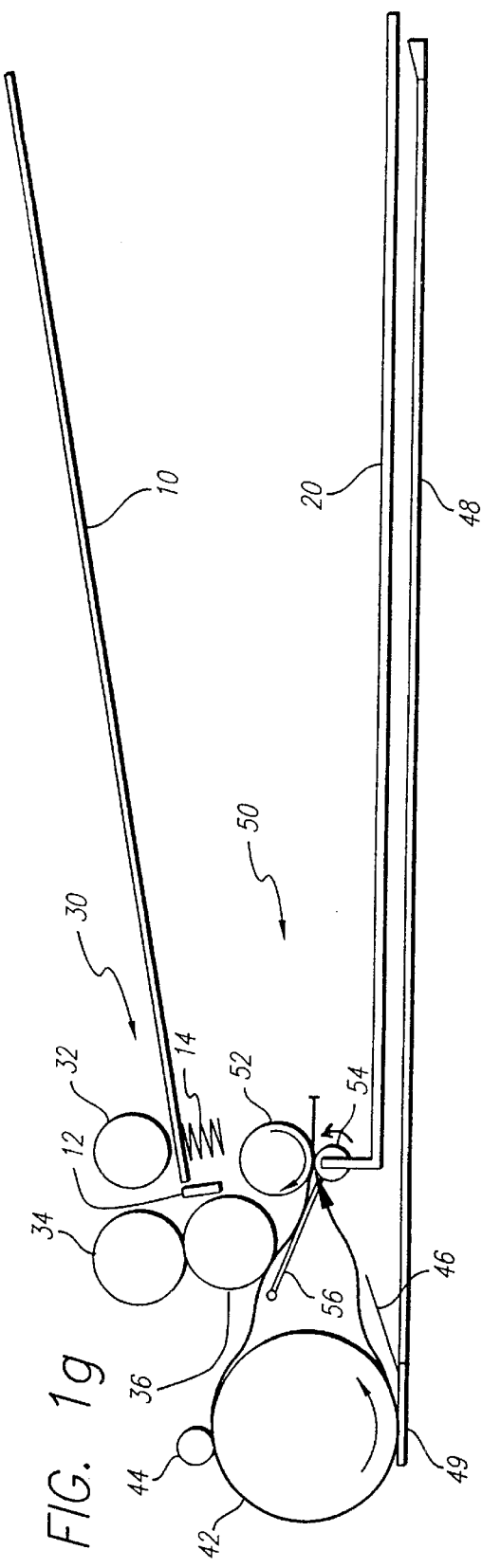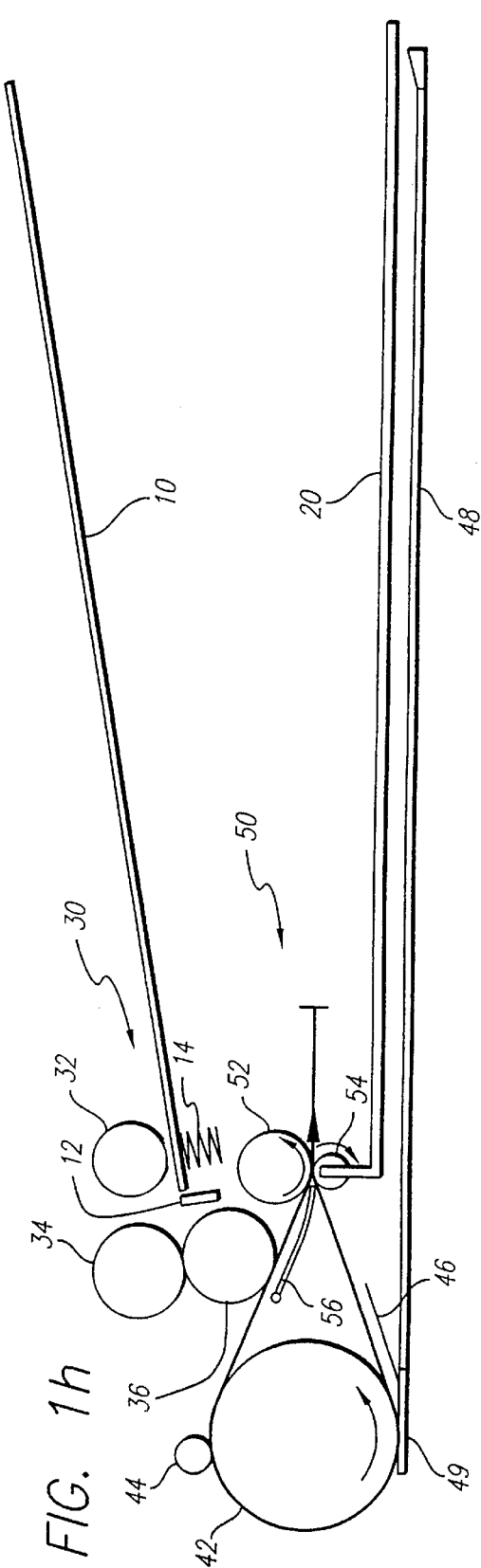

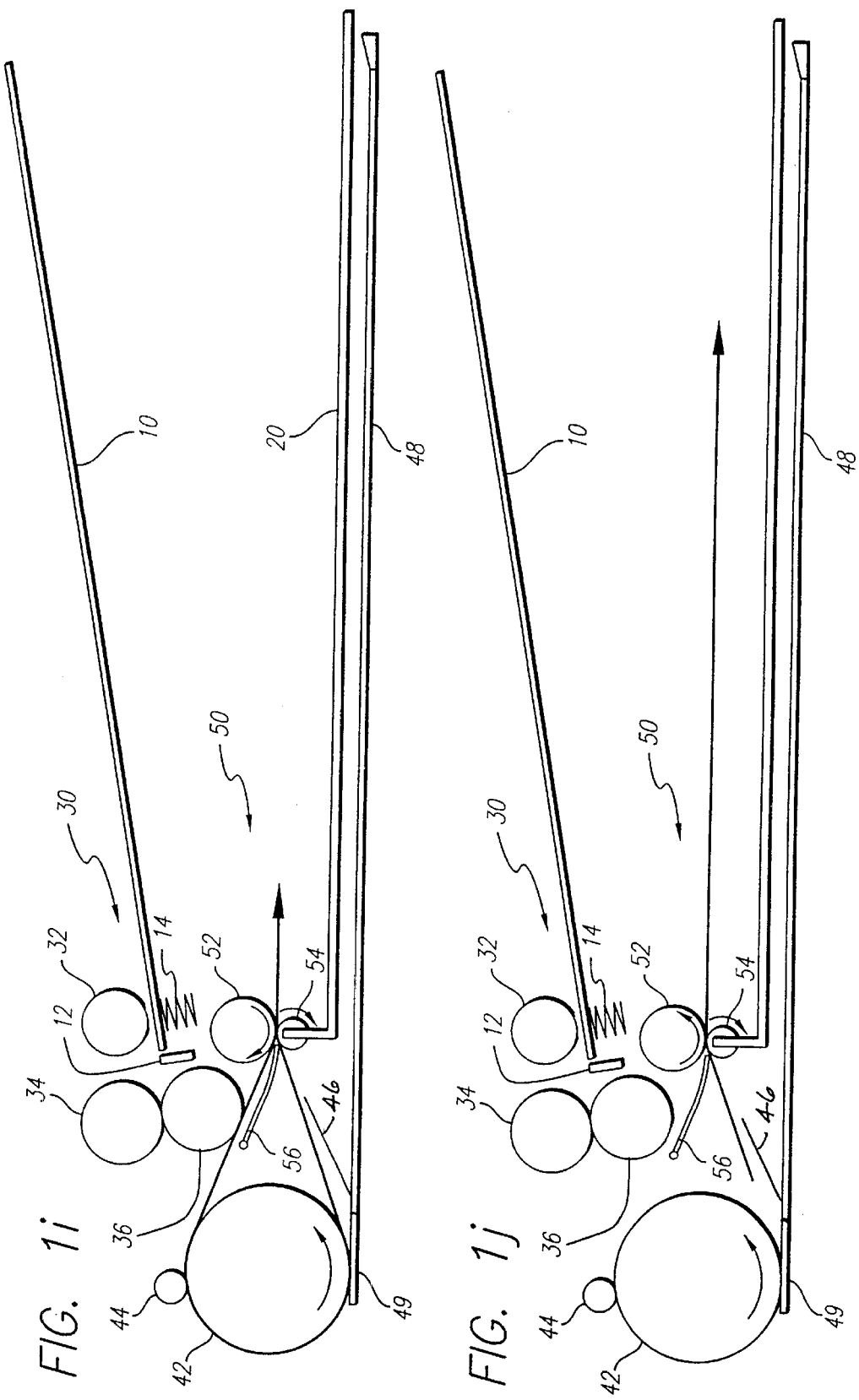

DUPLEXING IN AUTOMATIC DOCUMENT FEEDER UTILIZING A PATH SHORTER THAN THE LENGTH OF THE DOCUMENT TO BE DUPLEXED

CROSS REFERENCE TO RELATED APPLICATION(S)

This is a divisional of copending application Ser. No. 09/452,831 filed on Dec. 1, 1999.

BACKGROUND OF THE INVENTION AND PRIOR ART

The present invention relates to the feeding of individual document sheets to be scanned in a document scanner and, more particularly to the document delivery system which receives the scanned documents and, if desired, routes the individual sheets back to the scanning region for duplex scanning, i.e., scanning of both sides of the document sheet. As used herein, the term "document scanning device" is intended to be broadly defined to include, but not necessarily be limited to, stand alone document copiers, facsimile machines, document scanning machines and combinations of such units.

Automatic document feed and delivery systems in large copiers capable of duplex scanning generally require a document feed path that is as long as the document that is to inverted during duplex scanning. While this is not a great disadvantage in a large piece of multi-user office equipment, in a small multi-function peripheral copier or scanning apparatus, it is of great impact on the footprint size of the apparatus. Large footprint size requires significant desk space which must be kept available. In such units, the length of the duplexing section alone approaches half of the document length. This is considerably large when duplex scanning legal size documents for example. Other disadvantages of a longer duplexing path are added cost due to additional rollers and guides to manage the extra length of media and the increased potential of document jamming due to the increased complexity. One manner of avoiding a long duplexing path is to eject the document outside the duplicating apparatus onto a tray which projects from the side of the machine. This solution also consumes space and has the added disadvantage of increased propensity for damage to the document while it is outside of the protective confines of the unit.

It is accordingly of considerable advantage to provide a more compact document scanning device by utilizing a more compact duplexing section.

SUMMARY OF THE INVENTION

The present invention provides a method of feeding and duplex scanning a document in a document scanning device comprising the steps of:

a) transporting individual sheets of said document from a stack thereof to a scan region of a scanning system;

b) scanning a first face side of said document sheet at said scan region;

c) transporting said sheet from said scan region to a pair of opposed document exit transport rollers;

d) gripping opposite face sides of said sheet in a nip between said exit transport rollers and rotating said exit transport rollers in an exit direction to pull said sheet therebetween in an exit direction to move a trailing edge of said sheet away from said scan region;

e) reversing the direction of rotation of said exit transport rollers before said trailing edge of said sheet passes therebetween to feed said sheet to said scan region in face inverted orientation for scanning a second face side of said document sheet;

f) scanning a leading portion of said second face side of said sheet and transporting a leading edge of said sheet to said nip between said exit transport rollers before a trailing edge of said sheet passes said nip in a feed direction to cause buckle formation in said sheet between said nip and said scan region;

g) again reversing the direction of rotation of said exit transport rollers to rotate said exit transport rollers in said exit direction to consume sheet buckle in said nip without causing differential slippage of adjacent leading and trailing portions of said sheet in said nip;

h) continuing to rotate a driven one of said exit transport rollers in said exit direction to pull a trailing portion of said sheet to said scan region and scanning said trailing portion of said second side of said sheet while permitting said trailing portion of said sheet to slip past a leading portion of said sheet in said nip; and i) rotating said exit transport rollers in said exit direction to eject said sheet from between said transport rollers.

In apparatus terms, a first embodiment of the present invention comprises a duplex document scanning device comprising:

a) a document input support for holding a stack of document sheets to be scanned;

b) a document feed system for transporting document sheets to a document scan region;

c) a document scanning system for scanning individual document sheets during movement thereof through said scan region;

d) a document output support for holding scanned document sheets;

e) a document delivery system for transporting scanned document sheets from said scan region to said output support, said delivery system including a driven roller, a pinch roller opposed to said driven roller and defining a document transport nip therebetween, said driven roller having a document contact surface which has a greater coefficient of friction than the coefficient of friction of the surface of the document sheets to be transported; and f) a drive arrangement for selectively rotating said driven roller in opposite directions.

A second embodiment of the invention provides a method of feeding and duplex scanning a document in a document scanning device comprising the steps of:

a) transporting individual sheets of said document from a stack thereof to a scan region of a scanning system;

b) scanning a first face side of said document sheet at said scan region;

c) transporting a leading edge of said sheet from said scan region into a gap between a pair of spaced document delivery rollers;

d) moving said document delivery rollers together to grip opposite face sides of said sheet in a nip between said document delivery rollers and rotating said document delivery rollers in a document delivery direction to pull said sheet therebetween and to move a trailing edge of said sheet away from said scan region;

e) rotating said document delivery rollers in a feed direction before said trailing edge of said sheet passes therebetween to feed and guide said sheet to said scan region in face inverted orientation for scanning a second face side of said sheet;

f) scanning said second face side of said sheet and transporting a leading edge of said sheet in a delivery direction toward said document delivery rollers before a trailing edge of said sheet passes said nip while moving in a feed direction;

g) separating said document delivery rollers from each other to form a gap therebetween to permit said leading edge of said sheet to pass said trailing edge of said sheet during sheet movement between said document delivery rollers;

h) allowing said trailing edge of said sheet to pass between said separated document delivery rollers and then moving said rollers together to rotate said document delivery rollers in said document delivery direction to eject said sheet from between said document delivery rollers.

The apparatus aspects of the second embodiment of the invention provides a duplex document scanning device comprising:

a) a document input support for holding a stack of document sheets to be scanned;

b) a document feed system for transporting document sheets to a document scan region;

c) a document scanning system for scanning individual document sheets during movement thereof through said scan region;

d) a document output support for holding scanned document sheets;

e) a document delivery system for transporting scanned document sheets from said scan region to said output support, said delivery system including a driven roller, a pinch roller opposed to and mounted for movement toward and away from said driven roller and defining a document transport nip therebetween;

f) a drive arrangement for selectively rotating said driven roller in opposite directions and for moving said pinch roller toward and away from said driven roller; and g) a gate for guiding movement of said sheet between said scan region and said document delivery system.

In a third embodiment the present invention provides a method of feeding and duplex scanning a document in a document scanning device comprising the steps of:

a) transporting individual sheets of said document from a stack thereof to a scan region of a scanning system;

b) scanning a first face side of said document sheet at said scan region;

c) transporting said sheet from said scan region to a first pair of opposed document delivery rollers, said pair comprising a driven roller and an opposed first pinch roller;

d) rotating said first pair of opposed document delivery rollers in a document delivery direction;

e) causing a leading edge of said document sheet to engage a rotating sheet edge guiding surface of said driven roller to move said leading edge in engagement with said surface toward and to be gripped in a nip between said first pair of document delivery rollers to pull said sheet therebetween in a document delivery direction to move a trailing edge of said sheet away from said scan region;

f) reversing the direction of rotation of said first pair of document delivery rollers to rotate said document delivery rollers in a document feed direction before said trailing edge of said sheet passes therebetween to feed said sheet to said scan region in face inverted orientation for scanning a second face side of said document sheet;

g) scanning said second face side of said sheet;

h) transporting a leading edge of said scanned sheet in said delivery direction to engage said sheet edge guiding surface of said driven roller to cause said leading edge to move toward and be gripped in a nip between a second pair of document transport rollers comprising said driven roller and an opposed second pinch roller; and i) continuing rotation of said second pair of document delivery rollers in said exit direction to eject said sheet from between said second pair of document delivery rollers.

The apparatus aspects of the third embodiment provide a duplex document scanning device comprising:

a) a document input support for holding a stack of document sheets to be scanned;

b) a document feed system for transporting document sheets from said document input support to a document scan region;

c) a document scanning system for scanning individual document sheets during movement thereof through said scan region;

d) a document output support for holding scanned document sheets;

e) a document delivery system for transporting scanned document sheets from said scan region to said output support, said delivery system including a driven roller having a surface for engaging and moving the leading edge of a document sheet in the direction of rotation of said driven roller, a first pinch roller opposed to said driven roller and defining a first document transport nip therebetween and a second pinch roller opposed to said driven roller and defining a second document transport nip therebetween; and f) a drive arrangement for selectively rotating said driven roller in opposite directions.

BRIEF DESCRIPTION OF THE DRAWINGS

FIGS. 1a through 1j are sequential schematic side elevation cross sectional views of a document feeder according to the present invention showing progress of a duplex scanned document therethrough in accordance with a first embodiment using document buckling and differential slippage through opposed exit drive and pinch rollers.

DESCRIPTION OF THE PREFERRED EMBODIMENTS

Figure 2A:
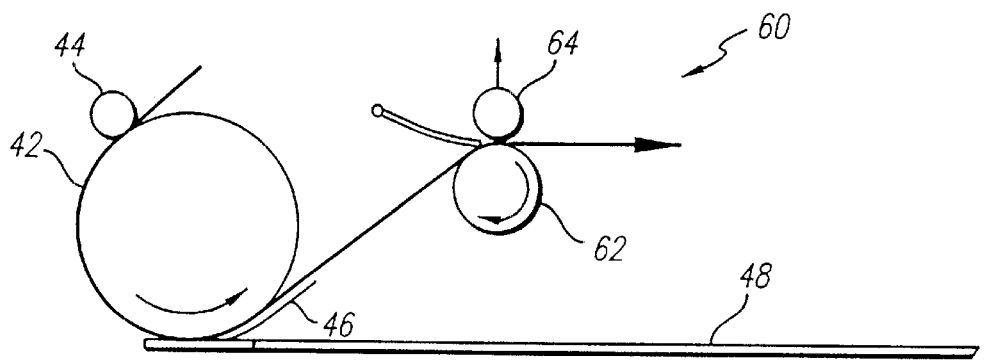
FIGS. 2a through 2f are sequential partial schematic side elevation views of a second embodiment using a moveable pinch roller and a document guide gate.

Since the constructional details of the various aspects of document scanning devices are well known, the present invention, being directed to the document delivery portion of such a device, i.e., that portion being downstream from the document scanning region, will be disclosed with reference to various side elevational drawings shown in schematic form.

As seen in FIG. 1a and in the subsequent figures wherein like reference numerals are used to designate like parts, the document scanning device includes a document input support tray 10 which is preferably inclined from the horizontal for gravitational assist in movement of individual document sheets from the input support tray 10 to a document feed system 30. The scanning device also includes a document output support tray 20 positioned as shown below the input support tray 10 for receiving and stacking scanned document sheets in an order which may be selected by the device operator. For example, if a stack of individual document sheets are to be simplex scanned, i.e., the source sheets bear information on one side only, the document sheets may be stacked face up on the input support tray 10 in numerical order, e.g., page 1 on top, with picking of individual sheets from the top of the stack so that the top sheet is scanned first with the scanned sheets being inverted and ejected onto the document output support tray 20 in face down order in the same order in which they were scanned. Other stacking orders and orientations of the documents in either face up or face down orientation are possible as will follow.

The document feed system 30 delivers individual documents to be scanned to a scanning system 40 which includes a document wrap roller 42 or cylindrical path and one or more pinch rollers 44 disposed about the periphery of the wrap roller 42 to hold individual document sheets closely in engagement therewith. The individual document sheets thus follow the surface of the wrap roller to and through a scanning station 49 at the left end of a platen 48. The specific details of the document scanning portion of the scanning device are not pertinent to the present invention. An inclined document guide 46 extends from the scanning station 49 direct the document sheets toward the document delivery system 50. Original document sheets to be scanned are fed by the document feed system 30 which may comprise a pre-feed or pick roller 32 which transports the top sheet from the stack of documents to a pair of active single sheet separation rollers 34, 36 which convey the sheet to the nip between the wrap roller 42 and pinch roller system 44. Although not important to the details of the present invention, it will be seen that a generally vertically extending stop 12 proximate the lower end of the document input support tray 10 operates in conjunction with a spring 14 which biases the lower end of the support tray upwardly so that a stack of documents thereon are abut the stop 12 with the top document sheet being engageable by the friction surface of the pre-feed roller 32. It will be further appreciated by persons skilled in the art that reference throughout the present disclosure to the various rollers such as the pre-feed roller 32 is intended to encompass arrangements where the roller constitutes a series of spaced rollers on a common shaft as well as a single roller as seen in the schematic drawings.

Turning now to the document delivery system 50, in the embodiment seen in FIG. 1 the delivery system 50 is comprised of an upper pinch roller 52 which is tangentially engaged with a lower driven roller 54 in the position shown. A document guide and movement control gate 56 which may be a flexible plastic gate of polyester sheet such as Mylar or the like is mounted in the scanning device such that the gate 56 presents a generally planar or flat surface extending from the nip between the rollers 52, 54 toward the nip between the scanning wrap roller 42 and the pinch roller 44. The lower end of the gate is moveable from the position shown in FIG. 1a where it is positioned in the intended path of movement of the document sheet to the right (the document delivery direction) from the scanning region 49 toward the nip between the rollers 52, 54. The inherent flexibility of the gate 56 permits the lower end of the gate to be bent by engagement with the leading edge of the sheet up and out of the way as seen in FIG. 1c to permit the sheet to be received in the nip between the pinch roller 52 and the driven roller 54. pinch roller 52 and the driven roller 54.

Progress of a document to be scanned using the first embodiment of the document delivery system 50 shown in FIGS. 1a–1j will now be described. The first step of transporting a document sheet to be scanned from the input support tray 10 through the scan region 49 involves separation of the first sheet of the document to be scanned from the remainder of the stack. This is accomplished in the document feed system 30 shown which picks the uppermost sheet from the document stack; however, there are known systems that are capable of picking the lowermost sheet from bottom of the stack which could be used in the present invention if desired. To pick a single document sheet, the pre-feed roller 32 is rotated (clockwise as seen in FIG. 1a) to pass the document sheet over the stop 12 to the nip between the active separation rollers 34, 36 which insure that no more then a single document sheet is fed at a time to the nip between the wrap roller 42 and pinch rollers 44. FIG. 1a shows the sheet being fed, the arrowhead pointing to the left schematically indicating the leading edge of the sheet. FIG. 1b shows the leading edge of the sheet having passed the wrap roller 42 and after it has been scanned in the scan region 49. It will be noted that the trailing edge of the sheet still has not passed entirely away from the input support tray 10 past the pre-feed roller 32.

FIG. 1c shows the position of the document sheet after the scanning of the first (upper) face side thereof. It should be noted that the sheet is now in inverted relationship after having been passed once around the wrap roller 42. Note also the flexing of the gate 56 which has been engaged by the leading edge of the moving document sheet and remains in the bent position as seen in FIG. 1c. But, in comparison, FIGS. 1b and 1d show the gate in its normal unbent position in which it functions to guide a document sheet moving to the left as seen in FIG. 1e in a path delivery rollers 52, 54 (FIG. 1d) so that document is now once again, guided by gate 56, fed to the wrap roller 42.

FIG. 1f shows the scanning of the second side (originally the lower side) of the document sheet as it once again passes around the wrap roller 42 through the scanning region 49 and the leading edge of the document being directed toward the document delivery rollers 52, 54 which continue to rotate in the document feed direction. Now, as the leading edge of the document sheet engages the rotating document delivery rollers as seen in FIG. 1g, sheet buckling is caused in the upper and lower reaches of the document sheet as shown. At this point, a portion of the second side of the document sheet has been scanned. Rotation of the document delivery rollers 50, 52 is again reversed as shown in FIG. 1h to consume all sheet buckle between the rollers such that both the leading and trailing edges of the document sheet are now on the right side of the document delivery rollers 52, 54 as seen in FIG. 1h. Creating the buckle removes back tension in the sheet and thus allows the leading edge of the sheet to be easily grabbed by the nip between the delivery rollers 52, 54.

In FIG. 1i the lower driven roller 54 of the document delivery system 50 continues to rotate in the document delivery direction but the direction of rotation of the upper pinch roller 52 has been reversed such that roller 52 now rotates, due to frictional contact with the document sheet, in the document delivery direction. This allows the document sheet to differentially slide past itself, the leading or lower edge of the sheet moving to the right while the trailing edge of the document is pulled to the left so that the remainder of the second side of the sheet can be scanned. This design feature and the designed in amount of differential overlap between the two ends of the longer, e.g., legal length, document sheets to be scanned results in reduction of the total size and resulting footprint of the apparatus as compared with scanning devices in which there is no sheet overlap in the scanning path. The differential slippage in the first embodiment of the invention is permitted by designing the document delivery driven roller 54 so that it has a roughened document contact surface which has a greater coefficient of friction than the coefficient of friction between the facing surfaces of the individual document sheets to be scanned so that slippage takes place between the opposed faces of the sheet rather than between the sheet and the driven roller 54. A suitable motor or motors and transmission system or systems, not shown, provide rotary power to the pre-feed roller 32, the active separation rollers 34, 36, the wrap roller 42 and the driven roller 54. The direction of rotation of the driven roller 54 is selectively changed by a control system which is well within the skill of persons skilled in the art and the details are therefore not essential to a full understanding of the invention. It will also be appreciated that the gate 56 may comprise a passive gate of polyester sheet material or other flexible plastic with good memory as shown in the drawings in which the lower right end of the gate is bent by contact by the leading edge of a moving document sheet. Alternatively, the gate might take the form of a rigid pivotally mounted planar member or a longitudinally slidable planar member; however, suitable electronic and mechanical control of gate movement adds unnecessary complexity to the preferred passive gate as described. FIG. 1*j* shows ejection of the duplex scanned sheet to the output tray 20 after completion of the scanning of the second side thereof.

Figure 2B:
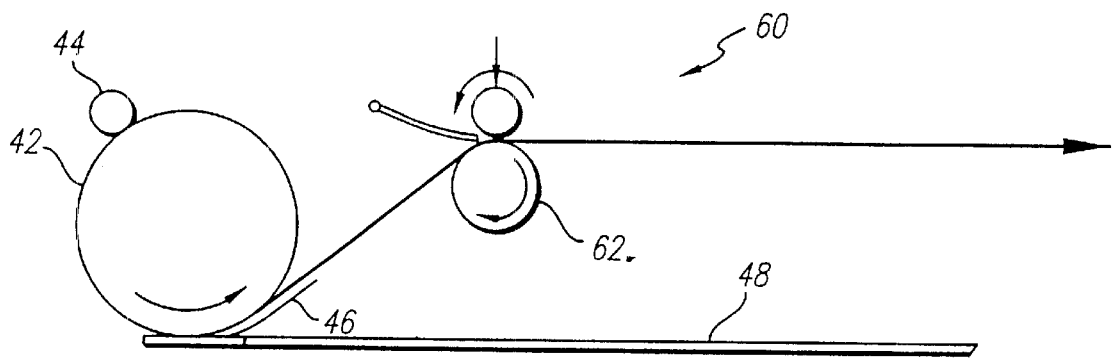
Figure 2C:
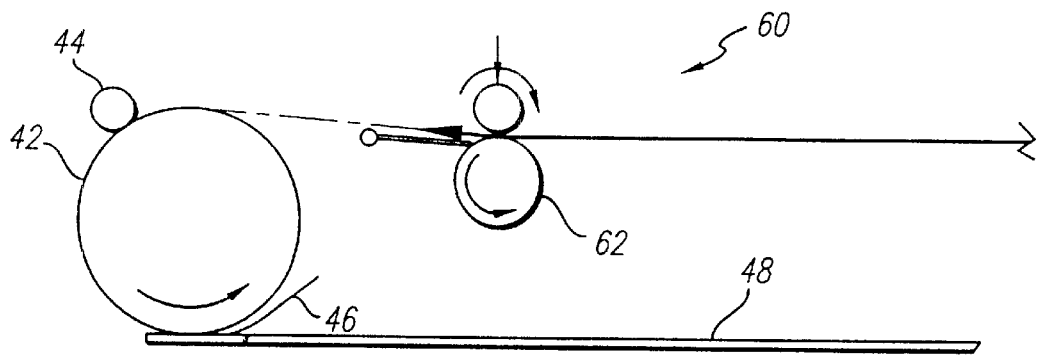
Figure 2D:
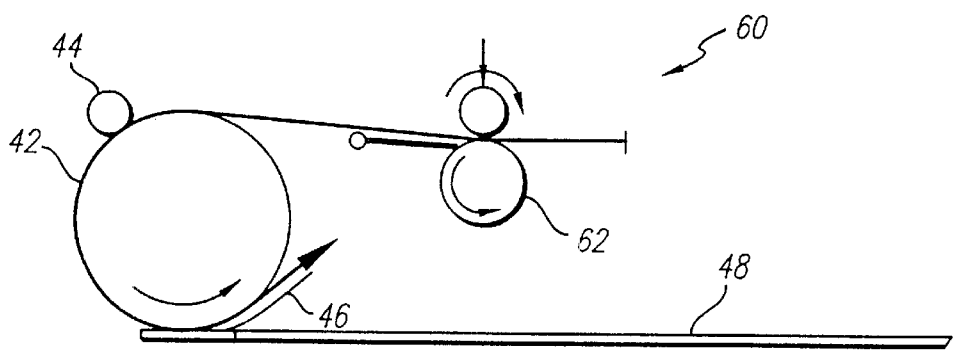
Figure 2E:
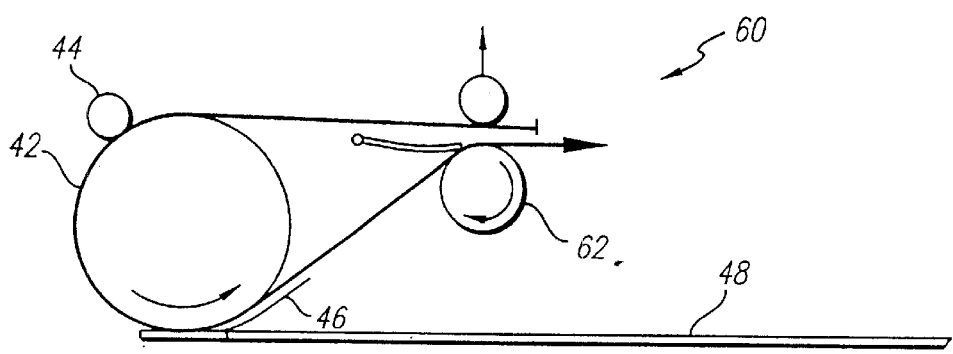
Figure 2F:
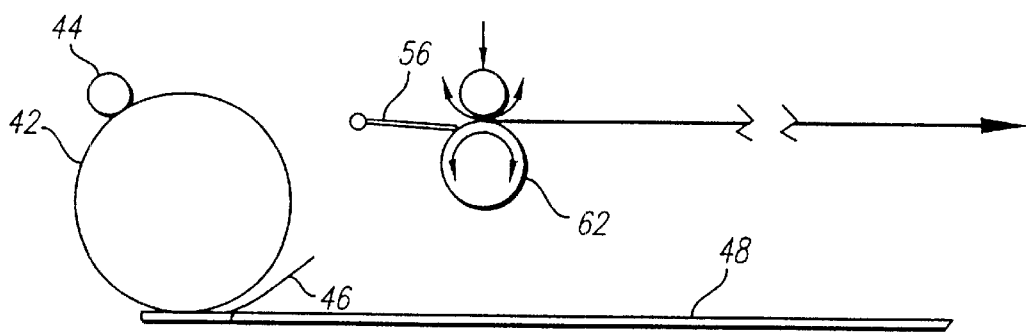

The second embodiment of the document delivery system 60 is shown in FIGS. 2*a*–2*f* and employs a driven roller 62 mounted below the document delivery path and an upper pinch roller 64 mounted for controlled movement toward and away from the driven roller 62 to create a nip and gap therebetween as desired. The other elements of the document scanning device not shown in the embodiment seen in FIGS. 2*a*–2*f* are substantially the same as seen in FIG. 1 including the document input support tray 10 and document output tray 20, a suitable document feed system 30 and a document scanning system 40. FIG. 2*a* shows document feed from the guide 46 which is directed toward a gap between the driven roller 62 and pinch roller 64 shown in the upper position as is indicated by the arrowhead in FIG. 2*a* to provide a gap for receiving without pinching the leading end of the scanned document. As seen in FIG. 2*b*, the pinch roller 64 is moved downwardly to its pinching position, the gate 56 being shown in flexed state, until the trailing edge of the document passes beyond the end of the flexed gate 56 but before it leaves the nip between the driven roller 62 and pinch roller 64. The direction of rotation of the driven roller 62 is then reversed as seen in FIG. 2*c* to feed the document, guided by the unflexed gate 56, toward the upper portion of the wrap roller 42 for scanning of the second side of the document as seen in FIG. 2*d*. In FIG. 2*e*, the pinch roller 64 is again raised to create the gap between the drive roller and pinch roller 62 is for reception of the leading edge of the document, the flexed gate acting to hold the leading edge of the document against the surface of the driven roller 62 as it rotates in the document delivery direction (clockwise in FIG. 2*e*) while the upper reach of the document is free to move toward the left through the gap between the rollers 62, 64. In FIG. 2*f*, the pinch roller 64 is again shown in its lowered position, the gate 56 is in its unflexed state, and the document sheet may either be completely ejected for delivery onto the output support tray 20 or the direction of rotation of the driven roller 62 may again be reversed to again feed the document to the wrap roller 42 through the scanning region 49 for one further inversion of the document sheet so that it can be stacked face down on the output support tray. Thus, a stack of document sheets can be scanned, one at a time, if they are provided in original face-up relation in consecutive order from top to bottom of the stack so that they are delivered onto the output tray in face down orientation and in their original order. The designed in amount of overlap between the leading edge and trailing edge of the document sheet (for the longer documents, e.g., legal length, to be scanned) seen in FIG. 2*e* results in reduction of the footprint of the unit in the manner described with reference to the embodiment seen in FIGS. 1*a*–1*i*.

Figure 3A:
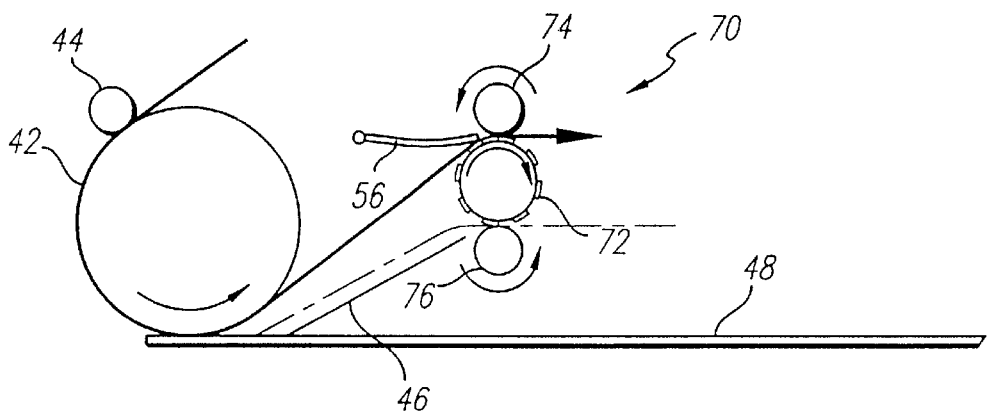
FIGS. 3a through 3c are sequential partial schematic side elevation views of a third embodiment using a three roller document transport with crenellated center roller.
Figure 3B:
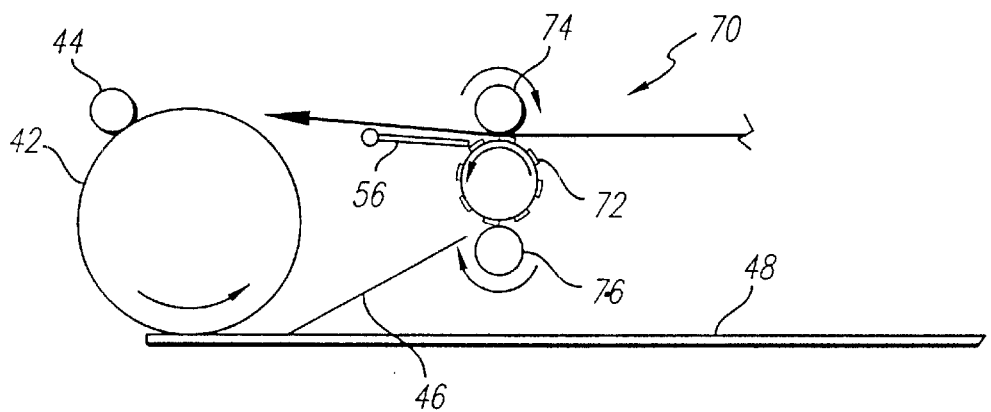
Figure 3C:
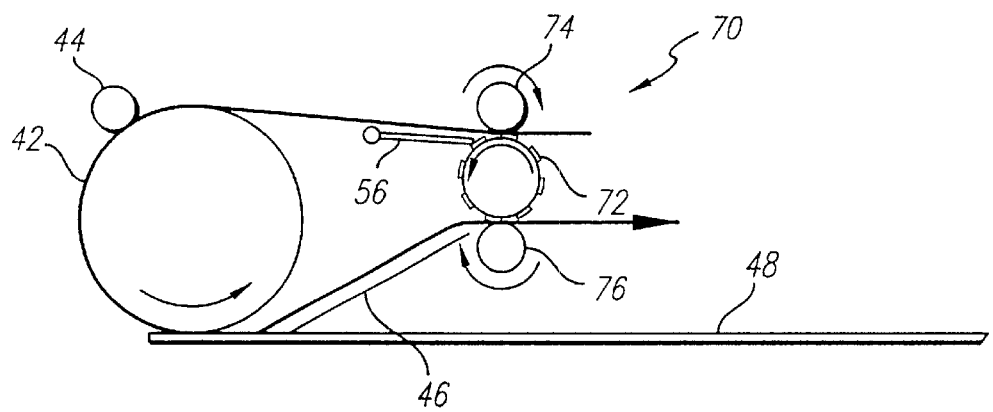

A third embodiment of the document delivery system 70 is shown in FIGS. 3*a*–3*c*. Here again, the delivery and output support trays 10, 20, the document feed system 30 and the scanner itself are not shown although they are of course required. In FIGS. 3*a*–3*c* the delivery system 70 includes a driven roller 72 having a peripheral sheet edge guiding surface which may be crenellated or toothed or otherwise provided with radially extending grooves or troughs or a sufficiently roughened surface to catch and move the leading edge of the document to be scanned in the direction of rotation of the driven roller 72. A first pinch roller 74 above the driven roller 72 forms a nip with roller 72 for receiving the leading edge of the scanned document sheet as shown in FIG. 3*a*. The dashed lines indicate the path of movement of the leading edge of the scanned sheet from the scan region 49 generally toward the center of rotation of the roller 72 where the leading edge of the sheet will engage and be received in one of the peripheral grooves to thus transport and position the sheet so that the leading edge will engage and be guided by the lower right end of the gate 56 into the nip between the driven roller 72 and the upper pinch roller 74 in the sheet delivery direction. In this embodiment the gate 56 may flex slightly upon contact with the sheet as the leading edge is brought to the nip between rollers 72 and 74.

In FIG. 3*b*, the direction of rotation of the driven roller 72 is reversed such that it now rotates in the sheet feed direction to move the leading edge of the sheet, which has not been allowed to pass the nip between the roller 72, 74, back along the upper surface of the gate 56 to the nip between the wrap roller 42 and the pinch roller 44 so that second side of the sheet can be transported by the wrap roller 42 through the scan region. Following scanning of the second side of the sheet, the leading edge is directed by the lower stationary guide 46 to the nip formed between the driven roller 72 and the lower pinch roller 76 whereby the scanned sheet may now be ejected from between the delivery rollers 72, 76 onto the output support tray 20. In this arrangement, the document sheet is scanned, inverted and scanned again but cannot once again be inverted as in the preceding embodiments before delivery to the output tray 20. In the embodiment of FIGS. 3*a*–3*c*, it will again be noted that the trailing edge of the sheet and the leading edge of a long sheet such as legal length overlap at the delivery system 70 although, unlike the previous two embodiments, the leading edge is between one pinch roller 76 and the driven roller 72 and the trailing edge of the sheet is between the other pinch roller 74 and the driven roller 72, thus resulting in reduction of the footprint size of the unit as described with reference to the first two embodiments of the invention.

In all of the three embodiments of the document delivery system which have been described, it will be appreciated that stationary sheet guides 46 may be used or not as desired in conjunction with or without a passive inherently flexible guide gate 56 or with a guide gate 56 whose movement is controlled in timed relationship with the direction of movement of the sheets to be scanned. Leading and trailing edges of long sheets to be scanned overlap in the delivery system rollers and roller reversal may be used to cause sheet buckling to conserve footprint space.

Persons skilled in the art will appreciate that various modifications can be made in the preferred embodiment shown and described above and that the scope of protection is limited only by the wording of the claims which follow.

What is claimed is:

1. A duplex document scanning device comprising:
   a) a document input support for holding a stack of document sheets to be scanned;
   b) a document feed system for transporting document sheets to a document scan region;
   c) a document scanning system for scanning individual document sheets during movement thereof through said scan region;
   d) a document output support for holding scanned document sheets;
   e) a document delivery system for transporting scanned document sheets from said scan region to said output support, said delivery system including a driven roller, a pinch roller opposed to said driven roller and defining a document transport nip therebetween, said driven roller having a document contact surface which has a greater coefficient of friction than the coefficient of friction of the surface of the document sheets to be transported; and
   f) a drive arrangement for selectively rotating said driven roller in opposite directions.

2. The document scanning device of claim 1, further comprising a gate for guiding movement of said sheet from said document delivery rollers to said scanning region.

3. The document scanning device of claim 2, wherein said gate is a passive gate which is flexed due to contact of said gate by a document sheet moving from said scan region toward said nip in said delivery roller system.

4. The document scanning device of claim 2, further comprising means for moving said gate from an inoperative position into an operative position to position said gate in sheet guiding position between said scan region and said document delivery rollers when said document delivery rollers are driven in a document delivery direction.

5. A duplex document scanning device comprising:
   a) a document input support for holding a stack of document sheets to be scanned;
   b) a document feed system for transporting document sheets to a document scan region;
   c) a document scanning system for scanning individual document sheets during movement thereof through said scan region;
   d) a document output support for holding scanned document sheets;
   e) a document delivery system for transporting scanned document sheets from said scan region to said output support, said delivery system including a driven roller, a pinch roller opposed to and mounted for movement toward and away from said driven roller and defining a document transport nip therebetween;
   f) a drive arrangement for selectively rotating said driven roller in opposite directions and for moving said pinch roller toward and away from said driven roller; and
   g) a gate for guiding movement of said sheet between said scan region and said document delivery system.

6. The document scanning device of claim 5, wherein said gate is a passive gate which is flexed due to contact of said gate by a document sheet moving from scan region toward said nip in said document delivery system.

7. The document scanning device of claim 5, further comprising means for moving said gate from an inoperative position into an operative position to position said gate in sheet guiding position between said scan region and said document delivery system when said document delivery rollers are driven in a document delivery direction.

8. The document scanning device of claim 5, further comprising a roller position controller for positioning said pinch roller in sheet gripping relationship with said driven roller when a single thickness of a document sheet is between said rollers and for positioning said pinch roller in sheet releasing position away from said driven roller when a double thickness of said document sheet is between said exit rollers to permit sliding of said sheet past itself between said rollers.

9. A duplex document scanning device comprising:
   a) a document input support for holding a stack of document sheets to be scanned;
   b) a document feed system for transporting document sheets from said document input support to a document scan region;
   c) a document scanning system for scanning individual document sheets during movement thereof through said scan region;
   d) a document output support for holding scanned document sheets;
   e) a document delivery system for transporting scanned document sheets from said scan region to said output support, said delivery system including a driven roller having a surface for engaging and moving the leading edge of a document sheet in the direction of rotation of said driven roller, a first pinch roller opposed to said driven roller and defining a first document transport nip therebetween and a second pinch roller opposed to said driven roller and defining a second document transport nip therebetween; and
   f) a drive arrangement for selectively rotating said driven roller in opposite directions.

10. The document scanning device of claim 9, wherein said surface of said driven roller is crenellated and said pinch rollers are positioned on substantially diametrically opposite sides of said driven roller for moving scanned document sheets in both document feed and delivery directions through said first nip and in a document delivery direction through said second nip.

11. The document scanning device of claim 10, further comprising a gate for guiding movement of said sheet from the nip between said first pinch roller and said driven roller to said scanning system.

12. The document scanning device of claim 11, wherein said gate is a passive gate which is flexed due to contact of said gate by a document sheet moving from said scan region toward said first nip.

13. The document scanning device of claim 11, further comprising means for moving said gate from an inoperative position into an operative position to position said gate in sheet guiding position between said scan region and said first nip when said document delivery rollers are driven in a document delivery direction.

\* \* \* \* \*